United States Patent [19]

Weihrauch

[11] Patent Number: 4,987,634
[45] Date of Patent: Jan. 29, 1991

[54] IMPLEMENT FOR CLEANING OR TREATING SURFACES OR FOR APPLYING MEDIA TO SURFACES

[75] Inventor: Georg Weihrauch, Wald-Michelbach, Fed. Rep. of Germany

[73] Assignee: Coronet-Werke Heinrich Schlerf GmbH, Wald-Michelbach, Fed. Rep. of Germany

[21] Appl. No.: 204,734

[22] Filed: Jun. 10, 1988

[30] Foreign Application Priority Data

Jun. 15, 1987 [DE] Fed. Rep. of Germany ....... 3719904

[51] Int. Cl.$^5$ .............................................. A47L 13/16
[52] U.S. Cl. ..................... 15/209 R; 15/145; 15/147 C; 294/100
[58] Field of Search ................. 15/145, 147 C, 209 R, 15/209 B, 209 C, 209 D, 209 E, 104.05; 294/100

[56] References Cited

U.S. PATENT DOCUMENTS

| 756,100 | 3/1904 | Crumb . | |
|---|---|---|---|
| 1,655,215 | 2/1928 | Banta . | |
| 2,296,133 | 9/1942 | Wolfe . | |
| 2,320,967 | 6/1943 | Dunkelberger | 294/100 |
| 2,752,625 | 7/1956 | Ponsell | 294/100 X |
| 2,786,223 | 3/1957 | Ziskind | 294/100 X |
| 3,481,641 | 12/1969 | Berger et al. | 294/100 |
| 4,457,038 | 7/1984 | Hammond | 15/14 S |
| 4,463,981 | 8/1984 | Curry | 294/100 |
| 4,575,143 | 3/1986 | Nast | 294/100 X |

FOREIGN PATENT DOCUMENTS

| 58395 | 3/1918 | Austria . | |
|---|---|---|---|
| 078123 | 4/1983 | European Pat. Off. . | |
| 2153309 | 4/1973 | France . | |
| 231223 | 6/1944 | Switzerland | 294/100 |
| 651454 | 4/1951 | United Kingdom . | |
| 677503 | 8/1952 | United Kingdom | 294/100 |

Primary Examiner—Chris K. Moore
Attorney, Agent, or Firm—Antonelli, Terry, Stout & Kraus

[57] ABSTRACT

A tool or implement for cleaning or treating surfaces or for applying media to surfaces has a holder and a deformable disposable working part interchangeably gripped by it, the holder exclusively comprising a sleeve constructed as a stick or grip and a sliding part guided thereon with a handle on its end projecting over the sleeve and with grippers arranged at its other end, which are displaceable from an open position projecting over the sleeve, exclusively by mounting on the working part and pressing by means of the sleeve so as to grip the working part into a use position fixing the latter and by means of the handle are displaceable in the reverse direction for releasing the working part.

10 Claims, 5 Drawing Sheets

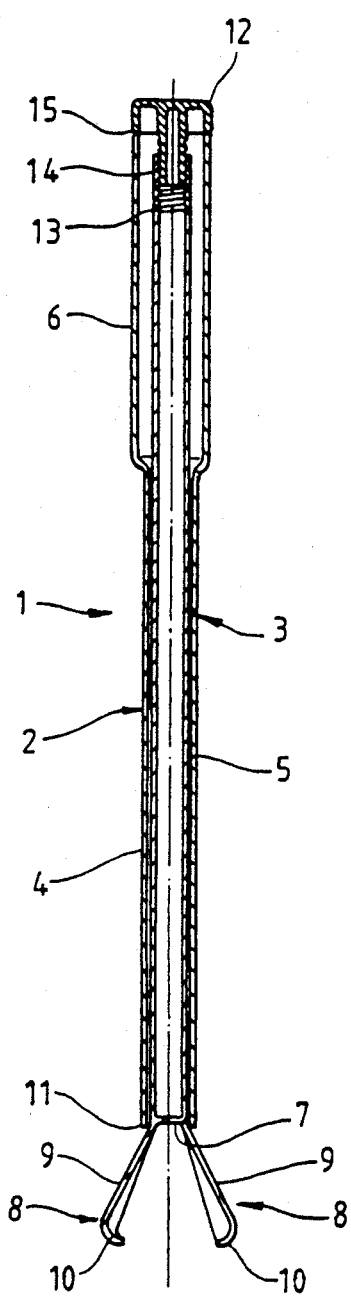
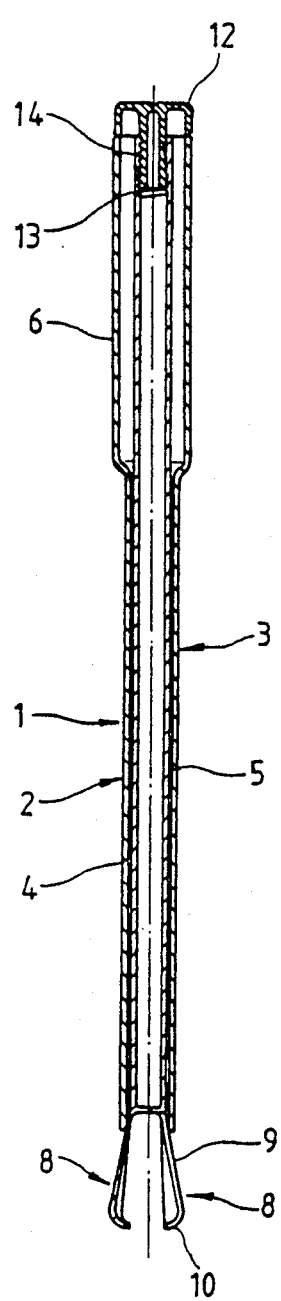
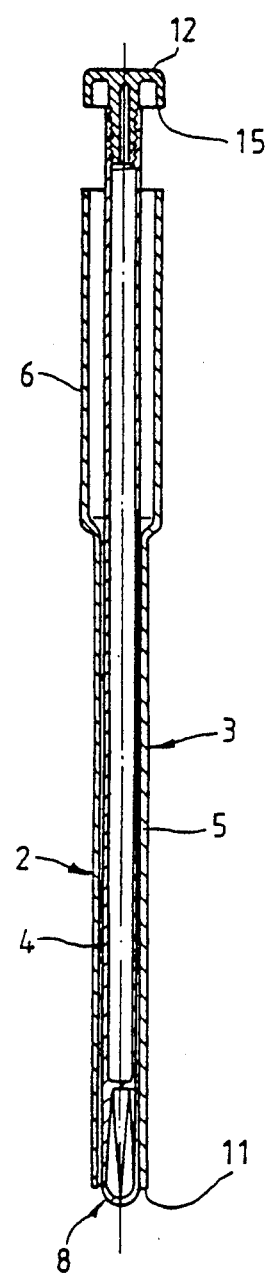
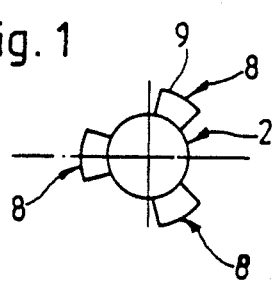
Fig. 1   Fig. 3   Fig. 2

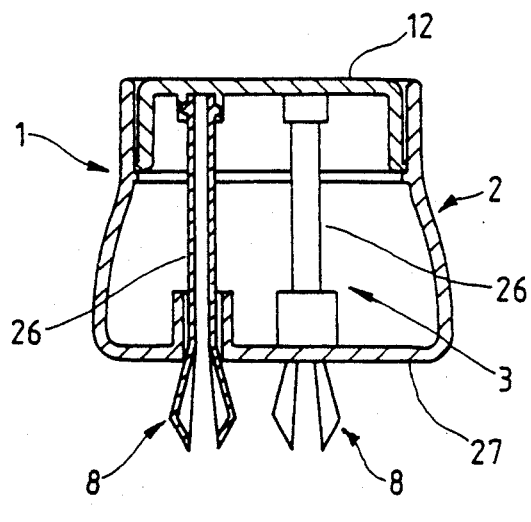
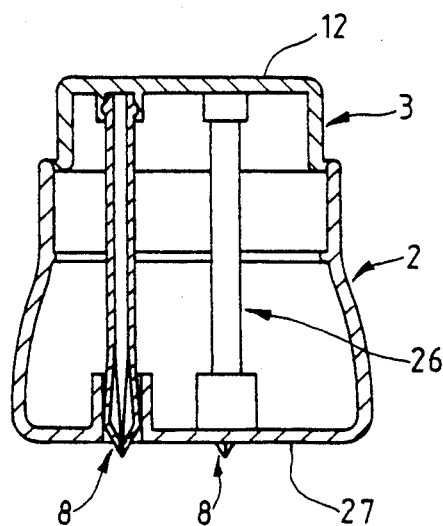
Fig. 6  Fig. 7
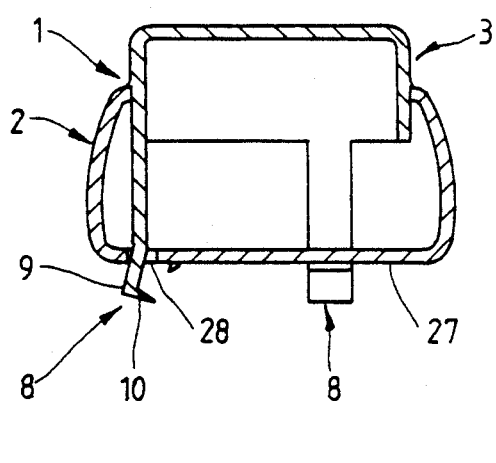
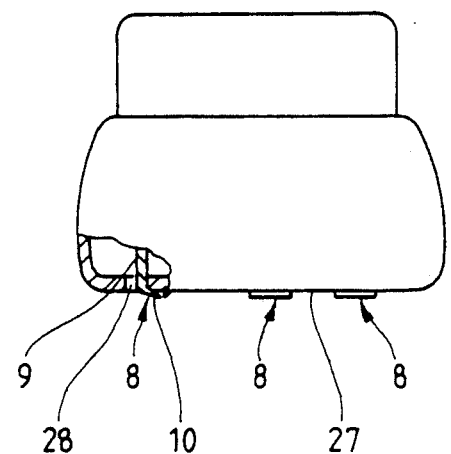
Fig. 8  Fig. 9

IMPLEMENT FOR CLEANING OR TREATING SURFACES OR FOR APPLYING MEDIA TO SURFACES

BACKGROUND OF THE INVENTION

The present invention relates to an implement for cleaning or treating surfaces or for applying media to surfaces with a holder and a deformable disposable working part inter-changeably gripped by said holder, the latter comprising a sleeve constructed as a stick or grip and a sliding part guided thereon with a handle on its end projecting over the sleeve and grippers for the working part arranged at its other end and which are displaceable from an open position projecting over the sleeve into a use position fixing the working part and by means of the handle can be moved in the opposite direction for releasing the working part.

In connection with working implements or tools, particularly when intended for use in the home, many attempts have been made in the past to interchangeably fit to a holder the actual working part, which becomes unusable and is therefore thrown away as a result of dirtying, wear or the like, in such a way that the holder can be constantly reused. Thus, for example, a floor cleaning implement in the form of a mop is known (U.S. Pat. No. 756,100), in which a pad-like cloth is secured between two shear-like gripper arms, accompanied by the formation of a fold in the central region, one gripper arm being fixed to a conventional handle, whereas the other gripper is locked on the handle in the clamped position for the mop pad. By releasing the locking device, it is possible to release the mop cloth and optionally clean it or replace it by a new one if it is worn. The construction of the gripper or tong-like holder is such that only flat pads can be fixed over a relatively considerable length.

It is also known in connection with domestic cleaning appliances, e.g. for utensils (U.S. Pat. No. 2,296,133, FR-OS No. 2 153 309) to fit skein-like working parts, such as sponges, wire pot cleaners, etc./to a holder, which has two or more grippers, which can be moved between a spread open position and a closed use position. In one case (FR-OS No. 2 153 309) the grippers are located on a connecting rod, which is guided in a grip-like sleeve. By means of a spring located in the sleeve the connecting rod is moved into an upper position, where the grippers pass out of the spread apart position into the closed use position and grip the skein or sponge-like cleaning part. On displacing the connecting rod for gripper opening purposes, an ejector arranged on the connecting rod simultaneously acts on the working part. In the other known construction (U.S. Pat. No. 2,296,133), a plurality of rail-like metal grippers are pivotably mounted on the lower face of a grip on a circumferential circle. By mounting on the skein-like cleaning part in the form of a pot cleaner or the like and subsequent displacement of a sliding ring surrounding all the grippers, the hook-like ends of the grippers can penetrate the pot cleaner, in order to fix same to the grip.

Similar systems are known in the field of personal hygiene. Thus, a powder puff (U.S. Pat. No. 1,655,215) is formed in that the pad-like working part, which is made from cotton wool and a cloth surrounding same, can be gripped on its one side by means of hook-like grippers, which are fitted to the ends of a spring clip. The spring clip can here again be widened or constricted by a slinding ring surrounding the clip arms, so that on moving said arms together the hook-like grippers engage in the pad and can fix same between them, whereas following a corresponding displacement of the sliding ring and spreading apart the clip arms, the pad can be released again. In addition, a tooth care implement is known (Austrian patent No. 58 395), in which the holder is once again constructed in shear-like manner and an elongated cleaning pad is fixed between the shear arms acting as a gripper. The shear grips are locked together in the clamped position. Extensive development has taken place in the field of toilet cleaning implements, in order to replace conventional toilet brushes by disposable working parts and therefore better meet hygienic requirements. Thus, it is known (German Utility Models 1 993 757 and 76 25 294) to fix tampom-like cleaning pads by means of tong grippers displaceable on parallel guides, one of the tong grippers being under spring tension in a sleeve which moves same into the closed position, where the grippers fix the tampon-like cleaning pad between them. In another construction with tong-like arms, one arm has a bearing plate for a specially shaped cleaning pad, which passes through a recess on the other equi-contour tong arm (EP-B No. 1-0 078 123). In another construction (British patent No. 651 454) a multilayer cellulose pad is slotted on one side and is mounted on a rod-like sliding part and is fixed between a plate arranged thereon and a further plate, which is provided on a sleeve guiding the sliding part. Here again the sliding part is under a spring tension which moves together the plates and which is overcome by a pressure on a handle, so that the cleaning pad can be received in the slot.

The aforementioned working implement (British patent No. 897 556) is also used as a toilet cleaning tool. It comprises a sleeve and a rod-like sliding part displaceable therein and which is once again moved into the use position by means of a spring supported on an inner collar of the sleeve. The sleeve is provided at its one end with a funnel or spout-like extension through which the grippers fitted to the sliding part project outwards, whilst the sliding part has at the opposite end projecting over the sleeve a handle. By pressure on the handle counter to the spring tension, the grippers are moved outwards. As they are resiliently constructed, they are spread apart into an open position. After release of the handle the sliding part is moved in the opposite direction by means of the spring, the grippers being moved inwards into the closed use position on the inside of the spout-like extension. The cleaning part is formed by circular cloths, which are collapsed in paper bag-like manner by forming a point in the centre thereof and several of these are folded together. At the bag-like point, said cleaning part is gripped by the grippers of the implement.

Independently of the intended use, all the known implements of the aforementioned type suffer from the disadvantage that they comprise a plurality of functional components, which on the one hand leads to corresponding production and assembly costs and on the other can lead to operational problems. It is also disadvantageous that either only certain types, namely skein-like working parts can be directly gripped, or flat working parts must firstly be given a matched shape to enable them to be gripped by means of the implement.

On the basis of one of the aforementioned implements (British patent No. 897 556), the problem of the present invention is to propose a simpler construction for the holder and also to offer the possibility of being able to grip working parts of random shape and in particular flat working parts, without the construction of special gripping means on the working part and without using the hands.

SUMMARY OF THE INVENTION

According to the invention this problem is solved in that the holder exclusively comprises the sleeve and the sliding part and that the grippers and the sleeve at said end are constructed in such a way that the grippers grip the working part solely by mounting on the working part and pressing by means of the sleeve and accompanied by the deformation thereof in the held region can be moved into the working position.

As a result of the inventive construction firstly production and assembly costs are reduced in that the complete holder substantially only comprises two parts, namely the sleeve and the sliding part, which can be inexpensively manufactured and assembled. In addition, the grippers and the sleeve on the end thereof receiving the grippers are so constructed that the grippers, which automatically move into the open position due to their resilient construction following corresponding displacement of the sliding part, automatically pass into the use position by engagement and pressing on the working part, so that the sliding part is moved in the sleeve. Thus, it is merely necessary to grip the sleeve and to exert a pressure by means of the latter on the grippers, in order to bring the working part into the fixed position of use.

According to the invention the construction is such that the grippers, on being subject to the pressing action of the sleeve, move together the preferably flat working part in folding manner between them and move the folds into the space between them.

This construction in particular makes it possible to automatically grip flat working parts, such as paper cloths, woven and non-woven fabric, etc. by mounting the holder and pressing the sleeve and to fix same between the grippers. Thus, it is in particular possible to remove such flat working parts from a stack.

Preferably there are at least three grippers, which are displaced by an arc angle of in each case 120°, so that a better fixing is obtained than in the case of flat or two-arm grippers.

As is known per se, the grippers are resiliently constructed and by insertion in the sleeve by means of the sliding part can be moved from the open into the use position, said movement solely taking place by pressing the sleeve on the working part.

Appropriately the grippers comprise a gripper arm guided on the inner wall of the sleeve during the movement thereof and inwardly or outwardly directed claws. If the claws are directed inwards, then the working part is gripped in tonglike manner. If the claws are directed outwards, they can be spread from an inner position towards the outside and simultaneously grip flat a flat working part received by them.

In order to facilitate automatic gripping, the claws are advantageously constructed in such a way that the free ends point downwards in their open position, whereas they are approximately horizontal in the use position. As a result of said downwardly sloping ends, the claws can grip the flat working part and, as a function of the gripper movement, can foldingly inwardly collapse or outwardly fix the area located between them.

According to a preferred construction the claws are curved, so that they are approximately guided on an arc. This on the one hand prevents a perforation or tearing open of flat working parts and on the other hand ensures reliable gripping.

According to a preferred construction the at least three grippers are constructed in such a way that they can be moved from a spread open position into a closed use position, in which they form an approximately closed gripper head over the entire gripper length. This construction is particularly advantageous when using flat cleaning cloths as a cleaning head for toilet cleaning implements.

It is also advantageous if the sleeve is formed by a tube and the sliding part is also formed by a tube tightly engaging therein and which is closed at its one end, to which the grippers are fitted.

This construction is particularly suitable for toilet cleaning implements, in that on the one hand as a result of the closed construction of the sliding part and on the other hand as a result of its tight guidance in the tubular sleeve, the penetration of dirt is prevented and dirt cannot be deposited on the front part of the holder.

In order to facilitate handling, the tube forming the sleeve can be widened at its upper end to form a tubular grip. This function is also fulfilled if the sliding part has as a handle a cap engaging over the tubular grip and which on engaging with the latter determines the spread open position of the grippers. On mounting and pressing the sleeve, the cap-like handle moves away from the tubular grip, whereas through pressure on the handle towards the tubular grip, the grippers open and the cleaning part can be ejected.

In another advantageous construction the handle is axially adjustable on the sliding part for setting the opening width of the grippers. This in particular makes it possible when taking flat working parts, e.g. cleaning cloths, etc. from a stack to adjust the extent of the gripper movement and therefore the number of cleaning cloths simultaneously taken from the stack. The further the grippers open, the more flat cleaning cloths can be gripped.

To further facilitate handling, it is optionally possible to provide abutments on the outside of the sleeve for the fingers of a hand.

According to another construction the sleeve and the sliding part, at least on a lower part of their length, are bendable at right angles to their axis. This construction has the advantage that by means of the holder, by corresponding bending, at least on the lower length, points are accessible which are not in the immediate alignment of the sleeve and the sliding part. Thus, for example, in the case of toilet cleaning implements the advantage is obtained that the grippers or the cleaning part held by them can be guided more easily beneath the flushing rim or into the siphon or trap. It is also possible to pass the open grippers into the siphon, so that any parts caught or struck there and optionally also cleaning parts can be gripped again, it then being merely necessary to pull on the sliding part.

The inventive features have been described relative to the example of a toilet cleaning implement. However, the inventive construction is obviously also usable for other implement types. For example, the sleeve can have a roughly fist size and on a substantially closed face can have guide holes or sleeves for the penetration of the grippers on the sliding part. Such a hand-operated implement can once again be used for cleaning purposes, e.g. in the kitchen and also for applying media to surfaces or for treating surfaces with polishing or striping working parts.

It is particularly advantageous if the sliding part is displaceable in the sleeve to such an extent that the claws of the grippers fix the working part between them and the closed face of the sleeve. As a result of this construction, the closed face can simultaneously serve as an abutment for the working part secured between it and the grippers, so that a larger inflexible working surface is obtained.

A similar construction is obtained if the sleeve has a double-walled construction, the sliding part being guided on the inner sleeve and the outwardly bent claws by the gripper arms running on to the inner wall of the outer sleeve are spread outwards. In this embodiment the working part is not fixed between the grippers and instead is spread out between them. The sliding part is appropriately constructed as a tray, the grippers only projecting slightly over the tray bottom, so that the working part once again finds an abutment on the tray bottom. The two aforementioned variants are particularly suitable for scrubbing or polishing surfaces.

The invention also provides for a stand or the like which detachably receives the holder and which has an upwardly open container for receiving stacks of the substantially flat working parts, so that the actual implement and a stack of the flat working parts are directly juxtaposed and the working parts can be removed by simple manipulations.

It is also advantageous in this case if the container has in one side wall a gripping slot extending into the vicinity of its bottom. This construction on the one hand facilitates the insertion of the stack into the container and on the other hand individual flat working parts can be manually removed from the stack, in order to e.g. use them without the holder.

BRIEF DESCRIPTION OF THE DRAWINGS

The invention is described in greater detail hereinafter relative to non-limitative embodiments and the attached drawings, wherein show: FIG. 1 A longitudinal section through a first embodiment of the holder in the open position.

FIG. 2 The holder according to FIG. 1 in the closed position.

FIG. 3 The holder according to FIG. 1 in another open position.

FIG. 6 A longitudinal section through another embodiment of the implement with the grippers in the open position.

FIG. 7 The embodiment according to FIG. 6 with the grippers in the closed position.

FIG. 8 Another embodiment of the holder with the grippers in the open position.

FIG. 9 The holder according to FIG. 8 in the use position.

DETAILED DESCRIPTION OF THE PREFERRED EMBODIMENTS

Figure 4:
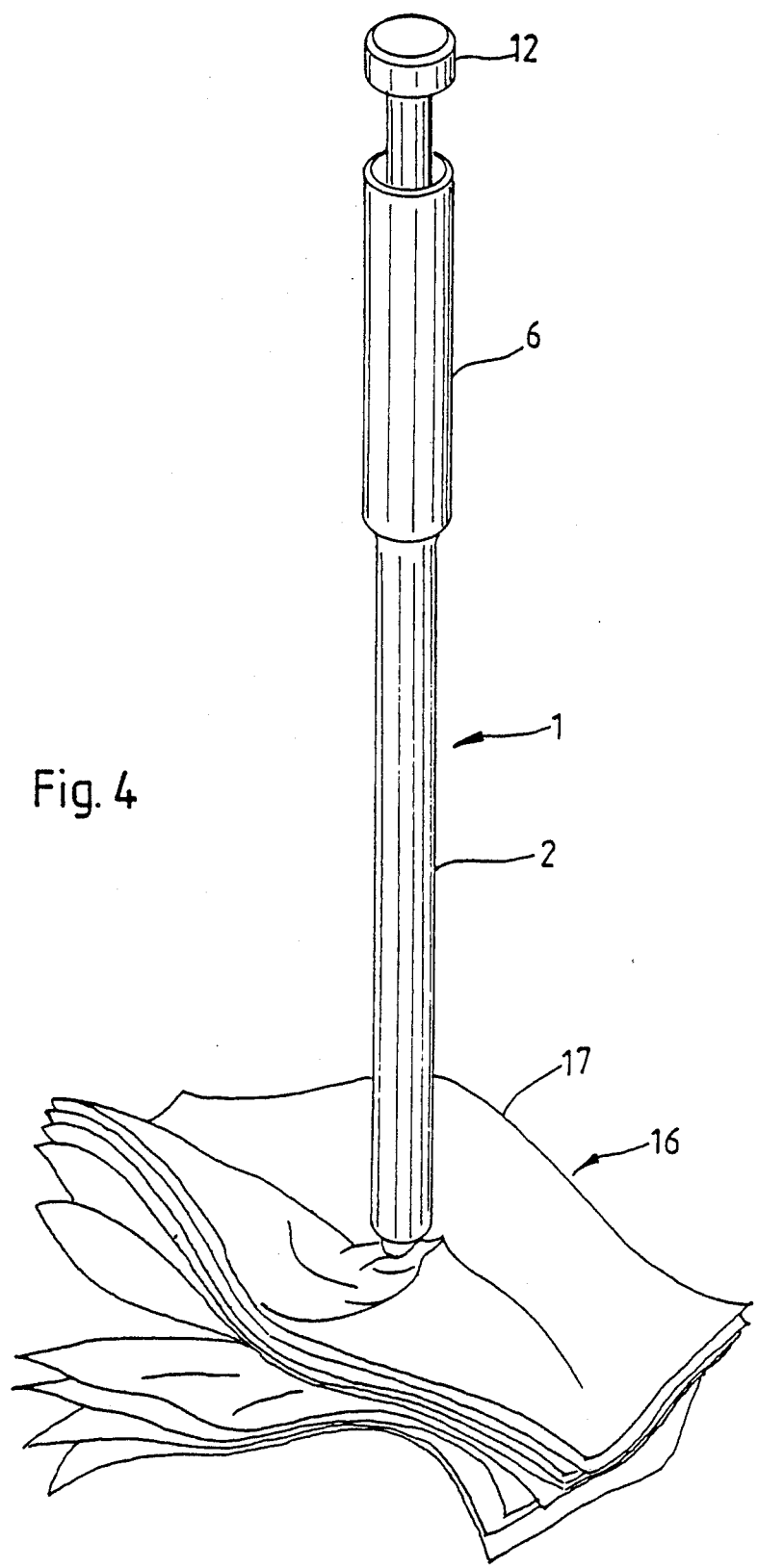
FIG. 4 A perspective view of the holder according to FIGS. 1 to 3 during use.

In the case of the embodiment shown in FIGS. 1 to 4, it is a rod-like implement, which can e.g. be used for cleaning toilets in place of conventional toilet brushes. The implement is formed by a holder 1, which comprises an outer sleeve 2 and a sliding part 3 guided therein. Sleeve 2 is formed by a tube 4 and in the present embodiment the sliding part 3 also is formed by a tube 5. Tubes 4 and 5 of sleeve 2 and sliding part 3 have over most of their length such a diameter adaptation that the sliding part 3 slides tightly in tube 4. The upper part of tube 4 forming sleeve 2 is widened to form a larger diameter tubular portion 6, which serves as a grip for the implement.

The bottom face 7 of sliding part 3 is closed. In the vicinity of its closed face the sliding part 3 has grippers 8, which are either in one piece with tube 5 or are connected thereto as separate parts. The grippers 8 have a resilient construction or are resiliently fitted to tube 5, so that they spread outwards in the lower position of sliding part 3, as indicated in FIG. 1.

The grippers 8 comprise substantially straight gripper arms 9 and claws 10 to be fitted thereto and which in the represented embodiment are rounded arcuately inwards and which in the shown open position point inwards and downwards. On displacing the sliding part 3 within sleeve 2 in the upwards direction, the gripper arms 9 slide along the open face 11 of the sleeve, so that claws 10 move towards one another and finally assume the closed position shown in FIG. 2. As shown in the plan view of FIG. 1, there are a total of three grippers 8, which are in each case displaced by 120° and are so constructed that they form an approximately closed gripper means in the closed position (FIG. 2).

At the upper end of sliding part 3 is provided a cap 12, which serves as a handle. In the represented embodiment it is screwed by means of a threaded journal 13 into an internal thread at the upper end 14 of tube 5. Cap 12 is located in the open position (FIG. 1) with its lower edge 15 on the upper face of the tubular portion 6. By turning cap 12, the total length of the sliding part can be changed and in particular it is possible to adjust the opening angle of the grippers 8, as is shown by means of a smaller opening angle in FIG. 3. The implement shown in FIGS. 1 to 3 is used for receiving flat working parts 16. For example, as shown in FIG. 4, they are cleaning cloths 17 arranged on a stack. In the open position of grippers 8 shown in FIG. 1, the holder 1 is placed on the stack and is pressed on to the latter by means of the hand engaging on the tubular portion 6 of sleeve 2, whereby the arcuate claws 10 grip at least the top cloth 17 in the stack and fold same inwards and upwards in the area between them, so that on reaching the closed position according to FIGS. 2 and 4 the top cloth 17 can be removed from the stack. At the end of the cleaning process the user presses on cap 12 and presses sliding part 3 downwards, so that the dirty cloth is ejected.

Figure 5:
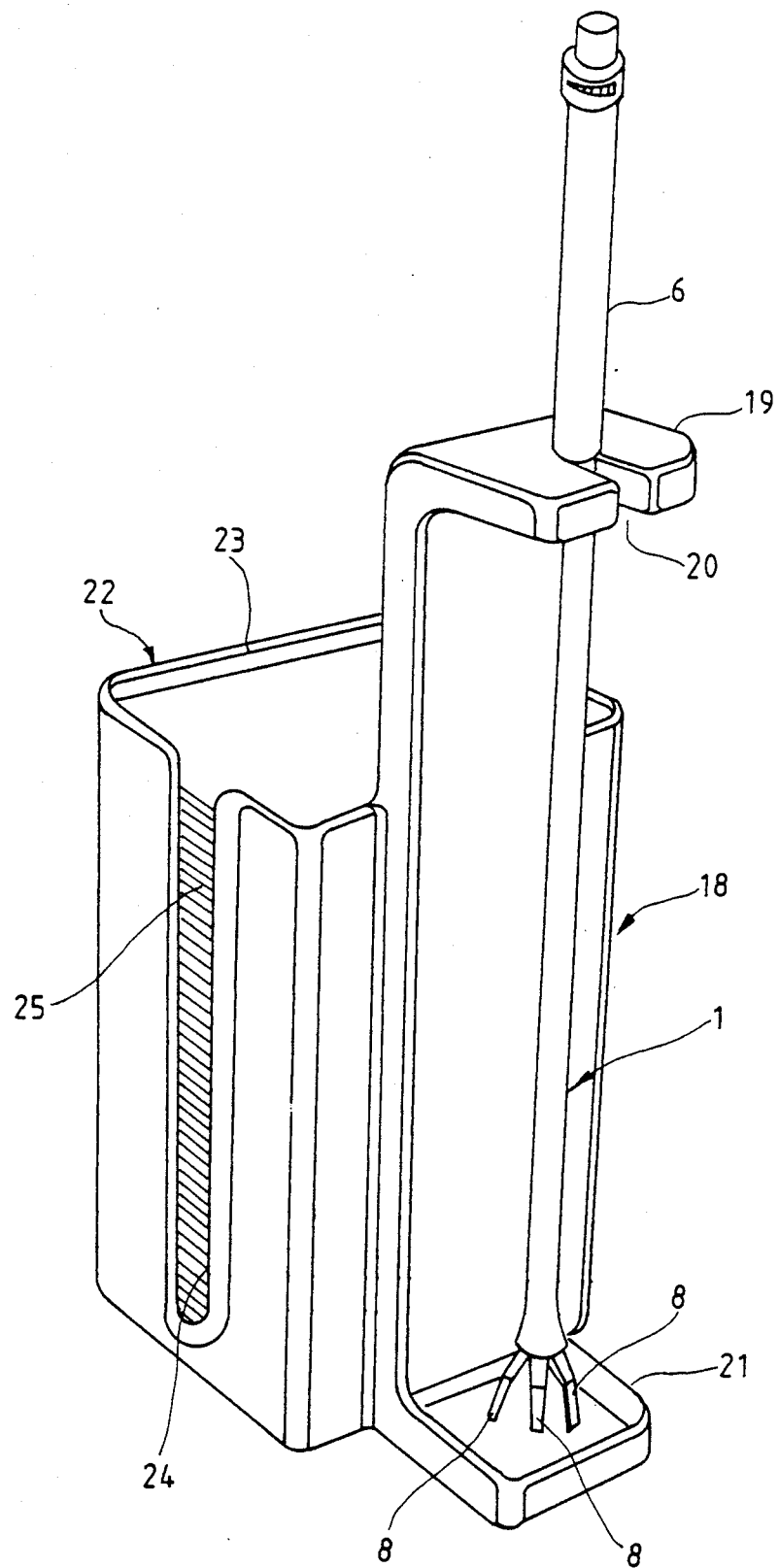
FIG. 5 A perspective view of a stand for a holder and a stack of flat working parts.

FIG. 5 once again shows holder 1, which is hung in a stand 18. For this purpose stand 18 has an upper bracket 19 with a slot 20, in which the holder 1 or the sleeve 2 is inserted in such a way that the widened gripping portion 6 is supported by its lower end on top of bracket 19. On the underside, the stand 18 also has a gripping tray 21 in order to catch any liquid dripping from the grippers 8.

The stand 18 also has a container 22, which is open at its top face 23 and on its one wall has a slot 24 extending to the vicinity of the base. Container 22 receives a stack 25 of cleaning cloths.

FIGS. 6 and 7 show an implement in the form of a hand-operated tool, whose holder 1 once again comprises a sleeve 2 and a sliding part 3 guided therein, which has a cap 12 terminating roughly flush with the top of the sleeve. Sliding part 3 comprises a plurality, e.g. three tubelets 26 displaced by 120° and which are provided on their lower end with in each case two or three grippers 8, which in the bottom position of the sliding part 3 project over a base 27 closing the sleeve 2 at the bottom. By mounting holder 1 on a flat working part, e.g. a cloth, non-woven fabric, pad, etc. and pressing the holder 1 the working part can be taken up by means of several grippers 8 and is brought into the closed position shown in FIG. 7, where the base 27 of sleeve 3 forms an abutment for the working part.

The embodiment according to FIGS. 8 and 9 also relates to a manually operated implement, in which the sleeve 2 has a tray-like construction and has at the bottom a tray base 27. The sliding part arranged in sleeve 2 once again has three grippers 8, which comprise a substantially straight gripper arm 9 and an inwardly projecting, hook-like claw 10. They pass through openings 28 in the tray base 27 of sleeve 2 and, are moved outwards into the position shown in FIG. 8 as a result of spring action. On mounting holder 1 on the preferably flat working part, the claws penetrate the same, guide it inwards and also upwards and clamp it between them and the tray base 27, so that the latter once again forms an abutment for the working part.

Figure 10:
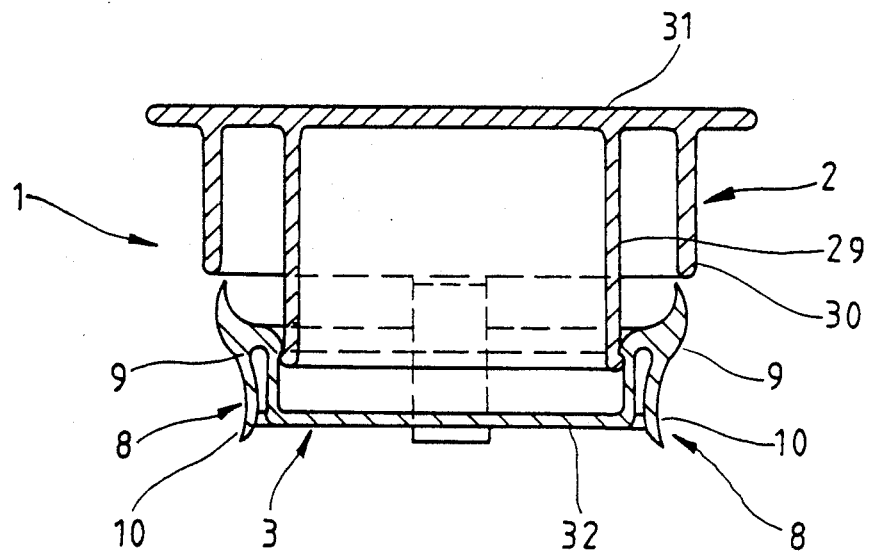
FIG. 10 A longitudinal section through another embodiment of an implement in the open position.
Figure 11:
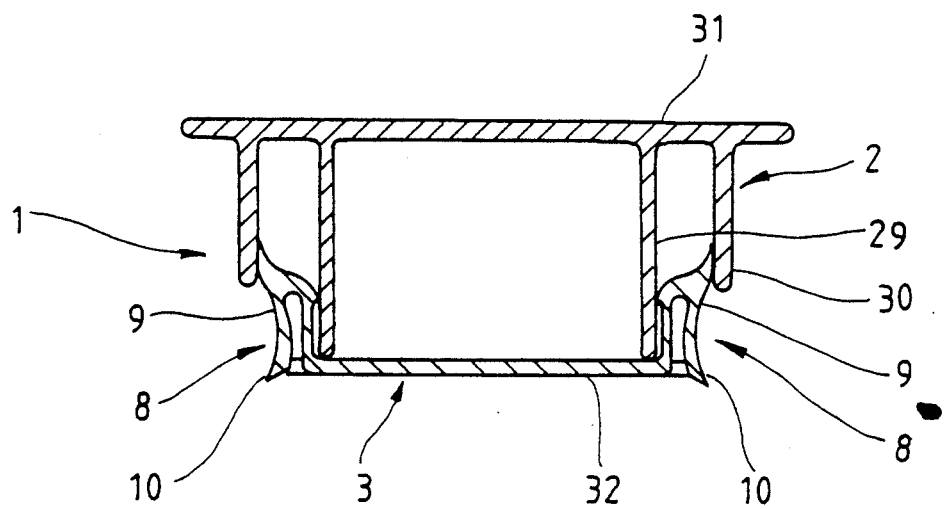
FIG. 11 The implement according to FIG. 10 in the use position.

Holder 1 according to FIGS. 10 and 11 is once again constructed as a manually operated implement. It has a sleeve 2, which comprises two concentric tubular portions 29, 30 and a pressure plate 31 connecting the same. Sliding part 3 once again has a closed base 27 and on its periphery three or more grippers 8, whose gripper arms 9 are resiliently located on sliding part 3 and whose claws 10 are directed outwards.

Sliding part 3 is guided on the inner tubular portion 29 of sleeve 2, whilst the outer tube 30 of sleeve 2 serves as a guide for the gripper arms 9. Through pressure on sleeve 2 the gripper arms 9 pass into the outer tube 30 and move the claws 10 outwards, so that a flat working part gripped by them is stretched outwards until the grippers finally reach the outermost spread-out position shown in FIG. 11, where the base 32 of sliding part 3 serves as an abutment for the cloth, nonwoven fabric or pad-like working part.

What is claimed is:

1. An implement for cleaning or treating surfaces or for applying media to surfaces with a holder and a deformable disposable working part interchangeably gripped by said holder, the latter comprising a sleeve and a sliding part guided thereon, a handle on an end of said sliding part projecting over the sleeve, and grippers for gripping the working part arranged at the other end of the sliding part, said grippers being displaceable in a first direction from an unobstructed, open position projecting over the sleeve into a use position for fixing the working part and by means of said handle said grippers can be moved via said sliding part in a second, opposite direction for releasing the working part, wherein the grippers and sleeve are constructed in such a way that the grippers grip the working part solely by mounting thereon and by pressing by means of said sleeve and are displaceable into the use position by deformation thereof in the held area, wherein said sleeve is in the form of a tube which is widened at its upper end to form a gripping tube, said handle being formed as a cap engaging over the gripping tube and which on engaging on the gripping tube determines the spread open position of the grippers, and wherein means are provided for axially adjusting the position of the handle relative to the sliding part for setting the maximum opening width of the grippers in said unobstructed, open position.

2. An implement according to claim 1, wherein on pressing by means of the sleeve, the grippers foldingly move together between them the preferably flat working part and move folds thereof in the space between them.

3. An implement according to claim 1, wherein at least three grippers are provided, which are equiangularly displaced from one another by angles of 120°.

4. An implement according to claim 1, wherein the grippers are resiliently constructed and by insertion into the sleeve by means of sliding part can be moved from the open position into the use position.

5. An implement according to claim 1, wherein the grippers comprise a gripper arm guided during the movement thereof on the inner wall of the sleeve and claws.

6. An implement according to claim 5, wherein the claws are constructed in such a way that in the use position their ends are approximately horizontal.

7. An implement according to claim 5, wherein the claws are arcuate.

8. An implement according to claim 1, wherein at least three grippers are provided which are constructed in such a way that they can be moved from a spread open position into a closed use position, in which they form an approximately closed gripper head over the length of the grippers.

9. An implement according to claim 1, wherein the sleeve comprises a tube and the sliding part comprises a tube tightly guided therein and which is sealed at its end, to which are fastened the grippers.

10. An implement according to claim 1, wherein the sleeve and the sliding part, at least on a lower part of their length, are bendable at right angles to their axis.

* * * * *